United States Patent Office 3,402,018
Patented Sept. 17, 1968

3,402,018
REMOVAL OF POTASSIUM AND SODIUM
SULFATE FROM BRINES AND BITTERNS
Oscar B. Waters, Jr., Simpsonville, and Murrell L. Salutsky, Silver Spring, Md., assignors, by direct and mesne assignments, of one-half each to the United States of America as represented by the Secretary of the Interior and to W. R. Grace & Co., New York, N.Y.
No Drawing. Filed Feb. 14, 1967, Ser. No. 616,444
10 Claims. (Cl. 23—121)

ABSTRACT OF THE DISCLOSURE

Gypsum ($CaSO_4 \cdot 2H_2O$) is digested in brine or bittern heated to 75°–105° C. and having an NaCl content of at least 134 g./l. whereby alkali sulfates form insoluble double salts with calcium sulfate which can be separated from solution.

---

This invention relates to the recovery of a mixture of alkali sulfates from sea water and other saline solutions.

It is of interest to recover alkali sulfates from brines and bitterns because (1) these sulfate chemicals are commercially valuable and (2) the presence of sulfate salts in brines and bitterns inhibits the recovery of other valuable compounds. Heretofore, the methods employed to recover these sulfates have resulted in incomplete removal. As a result, the remaining solution has been less desirable with regard to subsequent processes for the removal of other valuable compounds. Furthermore, incomplete removal methods are commercially unattractive.

It has now been discovered that these alkali sulfates can be more completely removed from such solutions by contacting a saline solution having a high NaCl content with gypsum while the solution is at a temperature of from about 75–105° C., to form an insoluble mixture containing alkali sulfates. Potassium and sodium sulfate are removed from the solution in accordance with the following reactions:

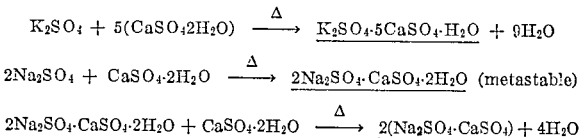

So far as is known, these double salts of sodium and potassium are formed at lower alkali sulfate concentrations than can be predicted from existing phase diagrams. Conventional separation techniques are then employed to remove the double salt mixture from solution, and hydrolysis can then be employed to form and separate out sodium and potassium sulfates.

It is therefore an object of the present invention to more completely desulfate brines and bitterns.

Another object is to efficiently recover a mixture of alkali sulfates from sulfate, sodium, and potassium-ion containing saline solutions such as brines or bitterns.

A further object is to convert the alkali sulfate salts in a saline solution to an insoluble mixture.

In the practice of this invention, a saline solution such as sea water is evaporated in, for example, a multistage evaporator or distillation unit until the solution is concentrated to where it contains NaCl in a concentration of at least about 134 g./l. (approximately half-saturated). Preferably, the solution should be saturated with NaCl at the gypsum treatment temperature. After the concentrated solution is heated to a temperature of from about 75–105° C., gypsum is added in an amount equal to at least the stoichiometric requirements with regard to the previously mentioned reaction formulas. Whatever quantity is employed, it can be added all at once, or the solution can be serially treated with fractions of the total gypsum requirement.

Conventional solids-liquid contacting expedients can be employed, and reaction times should be at least about 3 minutes for most saline solutions but can be carried on for as long as 2 hours.

Since $Na_2SO_4 \cdot CaSO_4$ and $K_2SO_4 \cdot 5CaSO_4 \cdot H_2O$ both hydrolize at ambient temperatures (20–40° C.), the insoluble mixture separated from solution after the gypsum treatment can be hydrolized to separate sulfate salts from one another. Under such treatment the $Na_2SO_4 \cdot CaSO_4$ yields soluble $Na_2SO_4$ and insoluble gypsum. A solution containing a maximum of 20% $Na_2SO_4$ can be obtained, after which insoluble $Na_2SO_4 \cdot 10H_2O$ is formed. The potassium salt, however, reacts with water to form $$K_2SO_4 \cdot CaSO_4 \cdot H_2O$$

(syngenite). Although the syngenite is substantially insoluble at ambient temperatures, a small amount of it will decompose to form a solution having a $K_2SO_4$ content of about 3%. Therefore, by initially maintaining a low ratio of liquid to solids during hydrolysis, a maximum quantity of $Na_2SO_4$ can be removed with a minimum of $K_2SO_4$. Thereafter an increase in the liquid to solids ratio removes the remaining $K_2SO_4$.

Exemplary saline solutions that may be treated by the process of this invention are sea water brines, natural brines, bitterns and solution mined alkali chloride-sulfate mixtures.

As an alternative to adding gypsum to solution, it could be formed in situ by adding, for example, $CaCl_2$. However, such a procedure would decrease total alkali sulfate recovery.

The following examples illustrate the effectiveness of the process.

EXAMPLE 1

200 ml. of concentrated sea water having the following composition:

| | |
|---|---:|
| $K_2O$ (g./l.) | 4.57 |
| $Na_2O$ (g./l.) | 141.5 |
| CaO (g./l.) | 0.69 |
| MgO (g./l.) | 19.70 |
| Cl (g./l.) | 165.0 |
| $SO_4$ (g./l.) | 18.24 |
| Concentration ratio | 10:1 |
| Specific gravity, 60/60° F. | 1.210 | was heated to 80° C. and serially treated with three 40 gram fractions of gypsum, each fraction being digested for 2 hours. Since there were approximately .758 g. potassium ion in each 200 ml. sample of water (as calculated from analysis), the gypsum:potassium ion weight ratio for the first serial treatment was 40:.758 (52.5:1), while the ratio for the three-step treatment was about 157:1.

For computational purposes, it was presumed that the sulfate ion was all present as sodium and potassium sulfates. Likewise, it was presumed that all the potassium ion was present as $K_2SO_4$ (approximately 8.45 g./l.), and all the sodium ion was present as $Na_2SO_4$ (approximately 20 g./l.) and NaCl.

Resultant solids from each step were filtered from hot solution, washed, dried and analyzed and the following results were obtained:

| Fraction: | Percent of original $K_2SO_4$ removed (cumulative) |
|---|---:|
| 1 | 48.9 |
| 2 | 74.7 |
| 3 | 82.2 |

EXAMPLE 2

Various quantities of gypsum were digested in 2 liter portions of the concentrated sea water employed in Example 1. The gypsum:potassium ion weight ratio ranged from 80.5:7.58 (10.6:1) to 322:7.58 (42.5:1). The brine was heated to 90° C., and a digestion time of 15 minutes was employed. The resultant solids were filtered, washed, dried and analyzed, and the following results were obtained:

| Gypsum added | $K_2SO_4$ in recovered solids (g.) | Percent of original $K_2SO_4$ recovered | $Na_2SO_4$ in recovered solids (g.) | Percent of original $Na_2SO_4$ recovered |
|---|---|---|---|---|
| 80.5 | 1.56 | 9.3 | 9.58 | 23.9 |
| 161.0 | 2.86 | 16.9 | 19.30 | 48.3 |
| 242.0 | 3.76 | 22.2 | 27.80 | 69.5 |
| 290.0 | 5.16 | 30.5 | 30.50 | 76.3 |
| 322.0 | 5.29 | 31.5 | 33.00 | 82.6 |

EXAMPLE 3

Various quantities of gypsum were digested in 2 liter portions of a solar salt bittern having the following composition:

| | |
|---|---|
| $K_2O$ (g./l.) | 13.53 |
| $Na_2O$ (g./l.) | 82.80 |
| $CaO$ (g./l.) | 2.69 |
| $MgO$ (g./l.) | 60.05 |
| $Cl$ (g./l.) | 181.0 |
| $SO_4$ (g./l.) | 48.28 |
| Concentration ratio | 29.5:1 |
| Specific gravity, 60/60° F. | 1.248 |

From the analysis it can be seen that each 2 liter portion of bittern contained approximately 22.4 g. potassium ion. The bittern was heated to 95° C., and a digestion time of 15 minutes was employed for each portion. Gypsum treatment ranged from a gypsum:potassium weight ratio of 100:22.4 (about 4.5:1) to a ratio of 300:22.4 (13.4:1). As in the previous examples, it was presumed, for computational purposes, that all the $SO_4$ in the bittern was present as sodium and potassium sulfates. Likewise, it was presumed that all the potassium was present as $K_2SO_4$ (approximately 25 g./l.), and all the sodium was present as $Na_2SO_4$ (approximately 50 g./l.) and NaCl.

The resultant solids after each treatment were filtered, washed, dried and analyzed, and the following results were obtained:

| Gypsum added | $K_2SO_4$ in recovered solids (g.) | Percent of original $K_2SO_4$ recovered | $Na_2SO_4$ in recovered solids (g.) | Percent of original $Na_2SO_4$ recovered |
|---|---|---|---|---|
| 100 | 4.78 | 9.6 | 15.78 | 15.4 |
| 150 | 7.85 | 15.7 | 29.40 | 28.8 |
| 200 | 8.90 | 17.8 | 41.50 | 40.6 |
| 250 | 11.80 | 23.6 | 45.20 | 44.3 |
| 300 | 13.85 | 27.8 | 43.60 | 42.7 |

EXAMPLE 4

2 liters of solar salt bittern, the same employed in Example 3, was heated to 95° C. and serially treated with three 300 gram fractions of gypsum, each fraction being digested for 15 minutes. The gypsum:potassium ion weight ratio in the first serial treatment was 300:22.4 (13.4:1). Resultant solids from each step were filtered from hot solution, washed, dried and analyzed, and the following results were obtained:

| Fraction | Cumulative $K_2SO_4$ in recovered solids (g.) | Percent of original $K_2SO_4$ recovered (cumulative) | Cumulative $Na_2SO_4$ in recovered solids (g.) | Percent of original $Na_2SO_4$ recovered (cumulative) |
|---|---|---|---|---|
| 1 | 12.58 | 25.3 | 46.7 | 45.7 |
| 2 | 21.33 | 42.6 | 91.9 | 90.0 |
| 3 | 26.66 | 53.5 | 120.1 | [1] 111.5 |

[1] The removal of more than 100% $Na_2SO_4$ was probably due to an in situ formation of some $Na_2SO_4$ from $CaSO_4$ and NaCl.

As can be seen from these examples, higher recoveries of alkali sulfates are obtained when the gypsum is fractionally added to the saline solution.

By the process of the present invention high recoveries of alkali sulfate from saline solutions are possible. Simultaneously, the potassium sulfate content of the solution can be unexpectedly reduced to as little as 0.50% by weight while total sulfate can be unexpectedly reduced to 0.31% in saline solutions having high NaCl concentrations.

While the particular process herein described is well adapted to carry out the objects of the present invention, it is to be understooood that various modifications and changes may be made all coming within the scope of the following claims.

What is claimed is:

1. A process for precipitating potassium and sodium sulfates from a saline solution containing potassium, sodium, chloride and sulfate ions, said chloride and sodium ions being present in sufficient quantity to give said solution an NaCl concentration of at least about 134 grams per liter, said potassium ion presumed to be present as potassium sulfate, comprising:

(a) adding gypsum to said solution while said solution is at a temperature of from 80° C. to about 105° C. to react said gypsum with said potassium, sodium, and sulfate ions, said gypsum being added in an amount of at least about 4.5 parts gypsum per part of said potassium ion presumed present in said solution as potassium sulfate to bring about the following reactions:

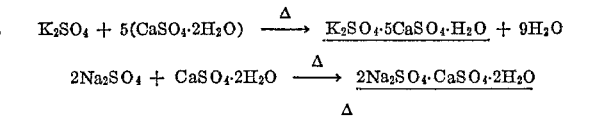

and (b) separating said $K_2SO_4 \cdot 5CaSO_4 \cdot H_2O$ and said $Na_2SO_4 \cdot CaSO_4$ as precipitate from remaining solution.

2. The process of claim 1 wherein said saline solution, at a temperature of about 75° C. to about 105° C., is saturated with NaCl.

3. The process of claim 1 wherein said saline solution is selected from the group consisting of sea water brines, bitterns, natural brines and solution mined alkali chloride-sulfate mixtures.

4. The process of claim 3 wherein said saline solution, at a temperature of about 75° C. to about 105° C., is saturated with NaCl.

5. The process of claim 1 wherein said reaction temperature is 80° C.

6. The process of claim 1 wherein said reaction temperature is 90° C.

7. The process of claim 1 wherein said reaction temperature is 95° C.

8. The process of claim 6 further comprising hydrolizing said separated solids mixture to separate sodium salts from potassium salts.

9. The process of claim 7 further comprising hydrolizing said separated solids mixture to separate sodium salts from potassium salts.

10. A process for treating a saline solution containing sodium, potassium, chloride and sulfate ions, said solution selected from the group consisting of brines and bitterns having a potassium sulfate content of more than 0.50% by weight when said potassium ion is presumed to be present as potassium sulfate, and when said sulfate ion, which is not present as said potassium sulfate, is presumed to be present as sodium sulfate comprising:

(a) concentrating said solution to establish an NaCl content of at least 134 grams per liter;
    (b) digesting gypsum in said solution while said solution is at a temperature of from 80° C. to about 105° C. to react said gypsum with said potassium, sodium, and sulfate ions, said gypsum being added in an amount sufficient to reduce said potassium sulfate content of said solution to about 0.50% by weight, said gypsum being added in an amount at least equal to the stoichiometric requirements for the following reactions in said solution:

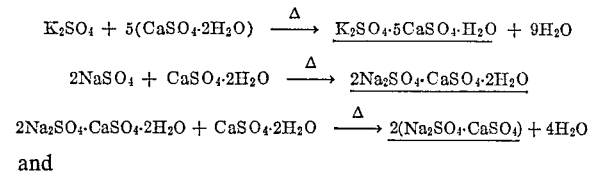

and (c) separating said $K_2SO_4 \cdot 5CaSO_4 \cdot H_2O$ and said $Na_2SO_4 \cdot CaSO_4$ as precipitate from said solution having a reduced potassium sulfate content of about 0.50% by weight.

References Cited
UNITED STATES PATENTS

| | | | |
|---|---|---|---|
| 1,343,443 | 6/1920 | Freeth | 23—38 |
| 1,415,204 | 5/1922 | Stevenson | 23—38 |
| 1,939,174 | 6/1932 | Kaselitz | 23—121 |
| 2,804,371 | 8/1957 | Dancy et al. | 23—38 |
| 3,248,181 | 4/1966 | Akimoto | 23—121 X |

EARL C. THOMAS, *Primary Examiner.*

G. O. PETERS, *Assistant Examiner.*